(12) United States Patent
Tseng

(10) Patent No.: US 9,244,233 B2
(45) Date of Patent: Jan. 26, 2016

(54) OPTICAL CONNECTOR HAVING REDUCED SIZE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 154 days.

(21) Appl. No.: 14/066,711

(22) Filed: Oct. 30, 2013

(65) Prior Publication Data

US 2014/0314369 A1 Oct. 23, 2014

(30) Foreign Application Priority Data

Apr. 23, 2013 (TW) .............................. 102114472 A

(51) Int. Cl.
*G02B 6/12* (2006.01)
*G02B 6/42* (2006.01)

(52) U.S. Cl.
CPC .............. *G02B 6/428* (2013.01); *G02B 6/4214* (2013.01); *G02B 6/4232* (2013.01); *G02B 6/4246* (2013.01)

(58) Field of Classification Search
CPC ....................................................... G02B 6/12

USPC ............................................................ 385/14
See application file for complete search history.

(56) References Cited

U.S. PATENT DOCUMENTS

| 6,754,407 | B2 * | 6/2004 | Chakravorty et al. .......... 385/14 |
| 2005/0135732 | A1 * | 6/2005 | Crow et al. ..................... 385/15 |
| 2012/0163811 | A1 * | 6/2012 | Doany et al. .................... 398/41 |
| 2013/0182997 | A1 * | 7/2013 | Fujiwara et al. ................ 385/14 |

* cited by examiner

*Primary Examiner* — Sung Pak
(74) *Attorney, Agent, or Firm* — Novak Druce Connolly Bove + Quigg LLP

(57) ABSTRACT

An optical waveguide includes a printed circuit board, a waveguide, a light emitter, a light receiver, a transparent driver, and a transparent processor. The driver and the processor are received in and mounted to the printed circuit board through a flip-chip method. The light emitter and the light receiver are mounted to the driver and the processor, respectively, through the flip-chip method. The planar waveguide is attached to a side of the printed circuit board opposite to the light emitter and the light receiver. The driver drives the light emitter to emit light according to input signals. This light is directed onto the light receiver through the driver, the planar waveguide, and the processor. The light receiver converts the light into electrical signals. The processor processes the electrical signals to obtain the input signals.

13 Claims, 3 Drawing Sheets

OPTICAL CONNECTOR HAVING REDUCED SIZE

BACKGROUND

1. Technical Field

The present disclosure relates to optical connectors, and particularly to an optical connector having a reduced size.

2. Description of Related Art

Optical connectors include a printed circuit board, a light emitter, a light receiver, a driver, a processor, a planar waveguide, and two shells. The light emitter, the light receiver, the driver, and the processor are located on and are electrically connected to one surface of the printed circuit board. The shells are also located on the printed circuit board and cover the light emitter and the light receiver, respectively. The planar waveguide is located on/above the printed circuit board and between the shells to couple the light receiver to the light emitter through the shells. However, such a configuration is not beneficial for miniaturization of the optical connector.

Therefore, it is desirable to provide an optical connector that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
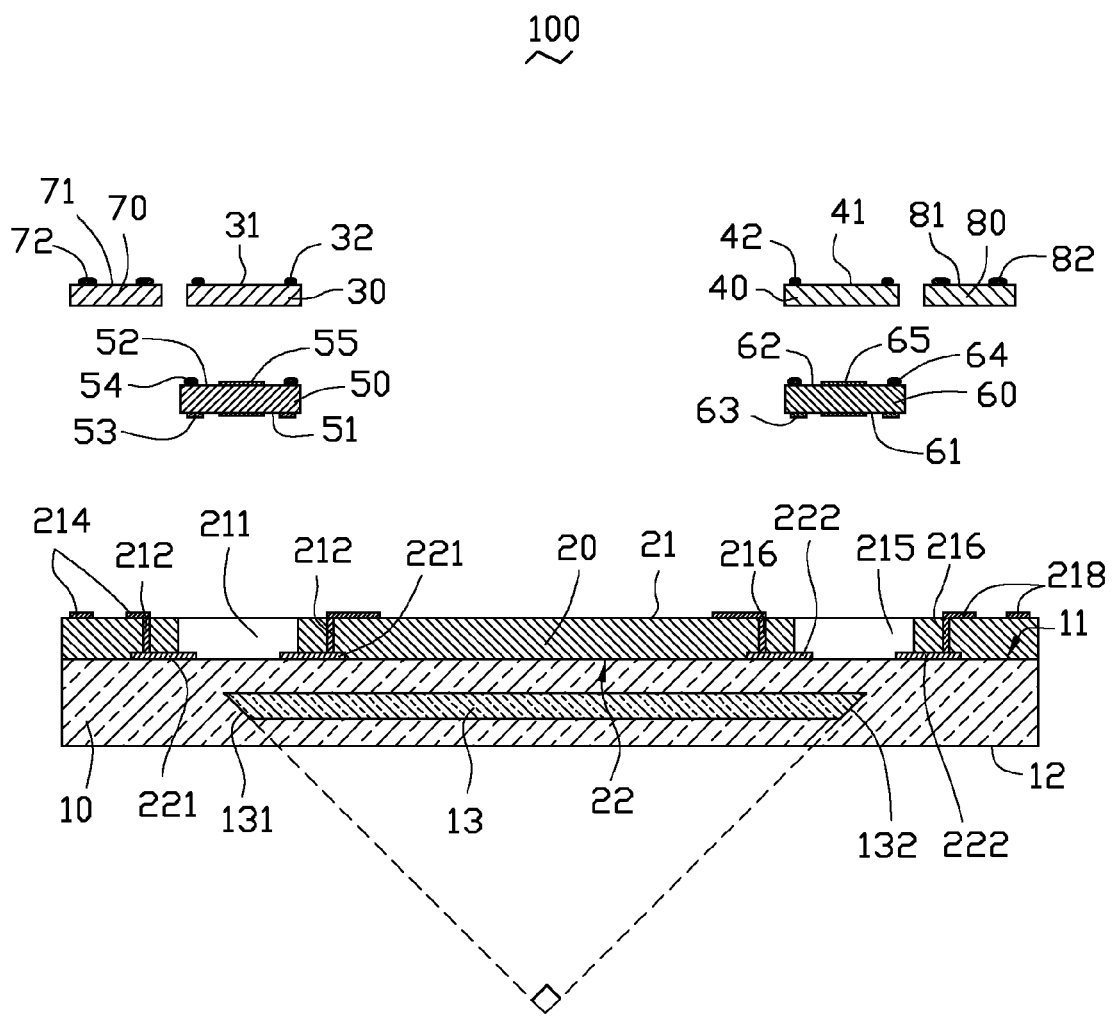
FIG. 1 is a cross-sectional, exploded, schematic view of an optical connector in accordance with an embodiment.
Figure 2:
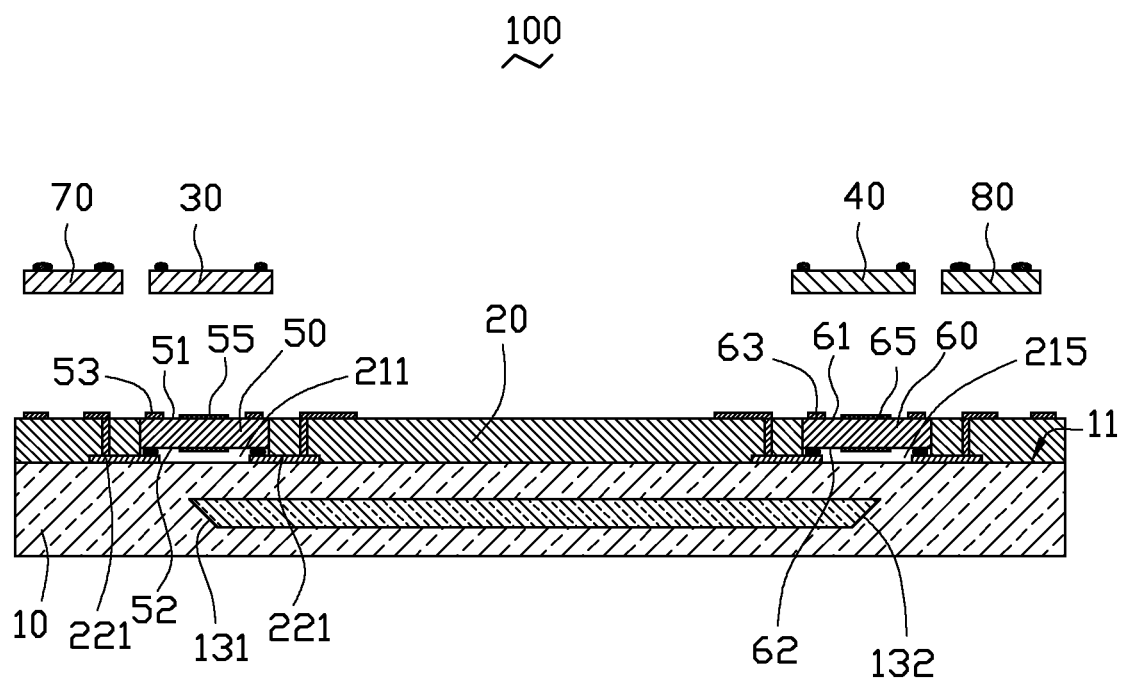
FIG. 2 is similar to FIG. 1, but shows a driver and a processor assembled in a printed circuit board of the optical connector.
Figure 3:
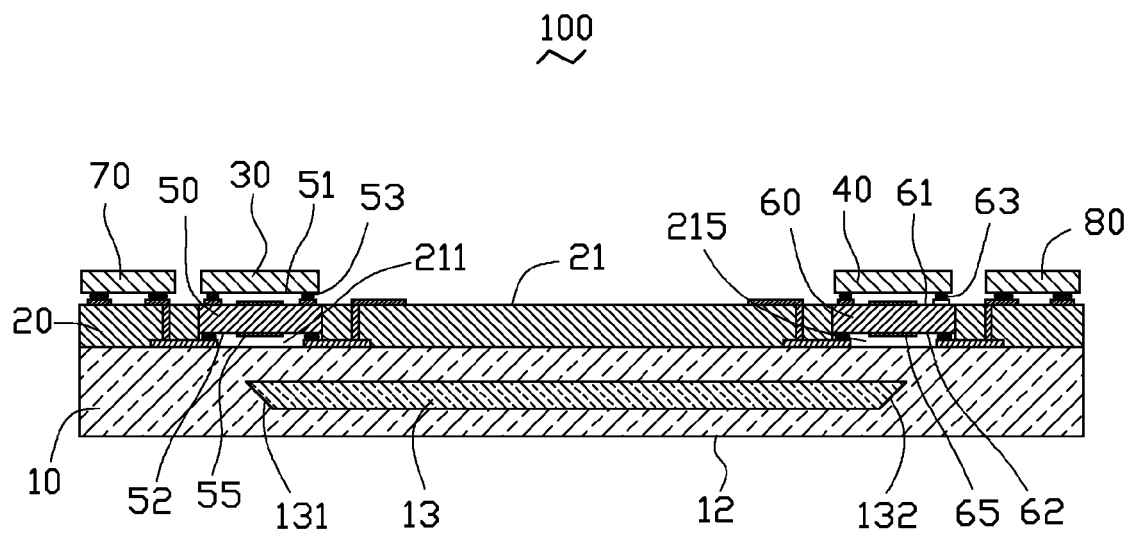
FIG. 3 is similar to FIG. 2, but shows a light emitter, a light receiver, a controller, and a memory are assembled on the printed circuit board of the optical connector.

FIGS. 1-3 show an optical connector 100, according to an embodiment. The connector 100 includes a planar waveguide 10, a printed circuit board 20, a light emitter 30, a light receiver 40, a driver 50, a processor 60, a controller 70, and a memory 80.

The planar waveguide 10 is transparent and includes an upper surface 11 and a lower surface 12 opposite to the upper surface 11. The planar waveguide 10 includes a substantially strip-shaped light guide 13, which is located between the upper surface 11 and the lower surface 12 and is substantially parallel to the upper surface 11. The light guide 13 is made of a material having a refractive index higher than a refractive index of the planar waveguide 10. The light guide 13 includes two sloped end surfaces 131, 132. Planes (shown as dashed lines of FIG. 1) coplanar with the end surfaces 131, 132 intersect with each other at about 90 degrees at a side of the lower surface 12 opposite to the light guide 13. Included angles between the slant surfaces 131, 132 and the upper surface 11 are about 45 degrees.

The printed circuit board 20 is made of silicon and includes a top surface 21 and a bottom surface 22 opposite to the top surface 21. The printed circuit board 20 is attached to the planar waveguide 10, such that the upper surface 11 contacts the bottom surface 22.

The printed circuit board 20 defines a first through hole 211 and a second through hole 215 extending through the top surface 21 and the bottom surface 22.

The printed circuit board 20 includes a number of first and second pads 221, 222 formed on the bottom surface 22 and attached to the upper surface 11. The first pads 221 are located at an periphery of the first through hole 211 and attached to the upper surface 11. A part of each first pad 221 extends into the first through hole 211. The second pads 222 are located at a periphery of the second through hole 215 and are attached to the upper surface 11. A part of each second pad 222 extends into the second through hole 215.

The printed circuit board 20 also includes a number of third and fourth pads 214, 218 formed on the top surface 21. The third pads 214 are located adjacent to the first through hole 211, and the fourth pads 218 are located adjacent to the second through hole 215.

The printed circuit board 20 includes first and second vias 212, 216 extending through the printed circuit board 20. The first vias 212 electrically connect the first pads 221 to the third pads 214. The second vias 216 connect the second pads 222 to the fourth pads 218.

The light emitter 30 can be a laser diode or a light emitting diode and includes a light emitting surface 31 and a number of first connectors 32 formed on an outer periphery of the light emitting surface 31. The first connectors 32 are arranged in a ball grid array (BGA).

The light receiver 40 can be a photo diode and includes a light receiving surface 41 and a number of second connectors 42 formed on an outer periphery of the light receiving surface 41. The second connectors 42 are arranged in a BGA.

The driver 50 is transparent and includes a first surface 51 and a second surface 52 opposite to the first surface 51. The driver 50 includes a number of fifth pads 53 formed on an outer periphery of the first surface 51 and a number of third connectors 54 formed on an outer periphery of the second surface 52. The third connectors 54 are in a BGA. The driver 50 also includes two anti-reflection films 55 adhered to central portions of the first surface 51 and the second surface 52, respectively. A size of the driver 50 is substantially equal to a size of the light emitter 30, but is slightly smaller than a size of the first through hole 211. The fifth pads 53 correspond to the first connectors 32. The third connectors 54 correspond to the first pads 221.

The processor 60 is transparent and includes a third surface 61 and a fourth surface 62 opposite to the third surface 61. The processor 60 includes a number of sixth pads 63 formed on an outer periphery of the third surface 61 and a number of fourth connectors 64 formed on an outer periphery of the fourth surface 62. The fourth connectors 64 are arranged in a BGA. The processor 60 also includes two anti-reflection films 65 adhered to central portions of the third surface 61 and the fourth surface 62, respectively. A size of the processor 60 is substantially equal to a size of the light receiver emitter 40, but is slightly smaller than a size of the second through hole 214. The sixth pads 63 correspond to the second connectors 42. The fourth connectors 64 correspond to the second pads 222.

The controller 70 includes a fifth surface 71 and a number of fifth connectors 72 formed on an outer periphery of the fifth surface 71. The fifth connectors 72 are arranged in a BGA. The fifth connectors 72 correspond to the third pads 214.

The memory 80 includes a sixth surface 81 and a number of sixth connectors 82 formed on an outer periphery of the sixth surface 81. The sixth connectors 82 are arranged in a BGA. The sixth connectors 82 correspond to the fourth pads 218.

In assembly, the driver 50 and the processor 60 are respectively received in the first and second through holes 211, 215 and are mounted to the planar waveguide 10 through a flip-chip method. The third connectors 54 are soldered to the first pads 221, and the fourth connectors 64 are soldered to the second pads 222. The light emitter 30 and the light receiver 40 are mounted to the driver 50 and the processor 60, respectively, through the flip-chip method. The fifth pads 53 are soldered to the first connectors 32, and the sixth pads 63 are soldered to the second connectors 42. An orthogonal projection of the end surface 131 onto the upper surface 11 falls within an orthogonal projection of the light emitter 30 (i.e., the light emitting surface 31) onto the upper surface 11. An orthogonal projection of the end surface 132 onto the upper surface 11 falls within an orthogonal projection of the light receiver 40 (i.e., the light receiving surface 41) onto the upper surface 11. The controller 70 and the memory 80 are mounted to the printed circuit board 20 through the flip-chip method. The fifth connectors 72 are soldered to the third pads 214, and the sixth connectors 82 are soldered to the fourth pads 218.

In operation, the controller 70 receives input signals and controls the driver 50 to drive the light emitter 30 to emit light according to the input signals. The light emitted from the emitting surface 31 passes through the driver 50 and is reflected by the end surface 131 into the light guide 130. The light is directed by the light guide 130 to the end surface 132 and is reflected by the end surface 132 to the light receiver 40 through the processor 60. The light receiver 40 converts the light into electrical signals. The processor 60 processes the electrical signals to obtain the input signals. Then, the input signals are stored/buffered in the memory 80.

As the planar waveguide 10 is located at a side of the printed circuit board 20 opposite to the light emitter 30 and the light receiver 40, a cross-sectional size of the optical connector 100 is effectively reduced. As the driver 50 and the processor 60 are received in the printed circuit board 20, a height of the optical connector 100 is also effectively reduced. Thus, a total size of the optical connector 100 is reduced.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An optical connector, comprising:
a printed circuit board;
a transparent driver and a transparent processor both received within and electrically connected to the printed circuit board by a flip-chip technology;
a light emitter and a light receiver mounted to and electrically connected to the driver and the processor respectively by the flip-chip technology; and
a planar waveguide attached to a side of the printed circuit board opposite to the light emitter and the light receiver;
wherein the driver drives the light emitter to emit light according to input signals, which is directed to the light receiver through the driver, the planar waveguide, and the processor, the light receiver converts the light into electrical signals, and the processor processes the electrical signals to obtain the input signals.

2. The optical connector of claim 1, wherein the printed circuit board is made of silicon.

3. The optical connector of claim 1, wherein the substrate comprises a top surface and a bottom surface opposite to the top surface, the substrate defines a first and second through holes extending through the top and bottom surfaces, and the driver and the processor are fittingly received in the first and second through holes respectively.

4. The optical connector of claim 3, wherein the planar waveguide comprises an upper surface and a lower surface opposite to the upper surface, the planar waveguide is attached to the bottom surface such that the upper surface contacts the bottom surface.

5. The optical connector of claim 4, wherein the printed circuit board comprises a plurality of first pads formed in the bottom surface and attached to the upper surface, the first pads are located at an periphery of the first through hole, a part of each first pad extends into the first through hole, the driver comprises a first surface and a second surface opposite to the first surface, the driver comprises a plurality of third connectors formed on an outer periphery of the second surface, and the third connectors are soldered to the first pads.

6. The optical connector of claim 5, wherein the driver comprises a plurality of fifth pads formed on an outer periphery of the first surface, the light emitter comprises a light emitting surface and a plurality of first connectors formed on an outer periphery of the light emitting surface, and the first connectors are soldered to the fifth pads.

7. The optical connector of claim 5, wherein the substrate also comprises a plurality of third pads and a plurality of first vias, the third pads are formed on the top surface and adjacent to the first through hole, the first vias extend through the top surface and the bottom surface and interconnect the first pads with the third pads in a desired manner, the optical connector also comprises a controller, the controller comprises a fifth surface and a plurality of fifth connectors formed on an outer periphery of the fifth surface, the controller is mounted to the substrate using the flip-chip technology, and the fifth connectors are soldered to the third pads, the controller is configured to receive the input signals and control the driver.

8. The optical connector of claim 4, wherein the printed circuit board comprises a plurality of second pads formed in the bottom surface and attached to the upper surface, the second pads are located at an periphery of the second through hole, a part of each first pad extends into the first through hole, the processor comprises a third surface and a fourth surface opposite to the third surface, the processor comprises a plurality of fourth connectors formed on an outer periphery of the fourth surface, and the third connectors are soldered to the first pads.

9. The optical connector of claim 8, wherein the processor comprises a plurality of sixth pads formed on an outer periphery of the third surface, the light receiver comprises a light receiving surface and a plurality of second connectors formed on an outer periphery of the light receiving surface, and the second connectors are soldered to the sixth pads.

10. The optical connector of claim 8, wherein the substrate also comprises a plurality of fourth pads and a plurality of second vias, the fourth pads are formed on the top surface and adjacent to the second through hole, the second vias extend through the top surface and the bottom surface and interconnect the second pads with the fourth pads in a desired manner, the optical connector also comprises a memory, the memory comprises a sixth surface and a plurality of sixth connectors formed on an outer periphery of the sixth surface, the memory is mounted to the substrate using the flip-chip technology, and the sixth connectors are soldered to the fourth pads, the memory is configured to store the input signals from the processor.

11. The optical connector of claim 4, wherein the planar waveguide comprises a strip-shaped light guide, which is located between the upper surface and the lower surface and is substantially parallel with the upper surface, the light guide is made of a material having a refractive index higher than a refractive index of the other part of the planar waveguide, the light guide comprises two sloped end surfaces, planes coplanar with the end surfaces intersect with each other at about 90 degrees at a side of the lower surface opposite to the light guide, included angles between the sloped end surfaces and the upper surface are about 45 degrees, orthogonal projections of the sloped end surfaces onto the upper surface respectively fall within orthogonal projections of the light emitter and the light receiver onto the upper surface.

12. The optical connector of claim 1, wherein the light emitter is selected from the group consisting of a laser diode and a light emitting diode.

13. The optical connector of claim 1, wherein the light receiver is a photo diode.

\* \* \* \* \*